Figure 1:
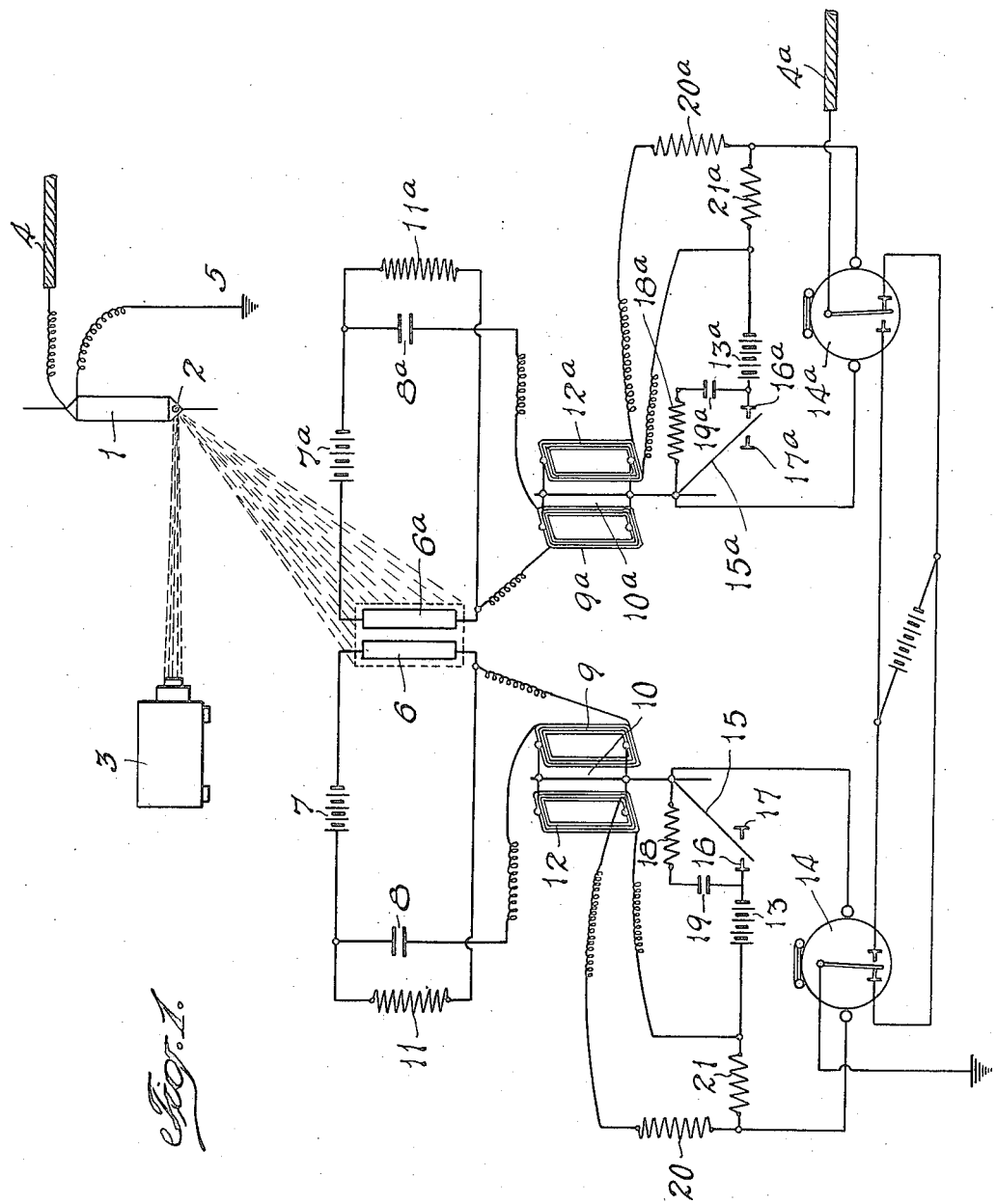

A. CUNNINGHAM.
TELEGRAPH.
APPLICATION FILED DEC. 14, 1917.

1,434,283.

Patented Oct. 31, 1922.

2 SHEETS—SHEET 1.

INVENTOR
Alexander Cunningham
BY
ATTORNEYS

A. CUNNINGHAM.
TELEGRAPH.
APPLICATION FILED DEC. 14, 1917.
1,434,283.
Patented Oct. 31, 1922.
2 SHEETS—SHEET 2.
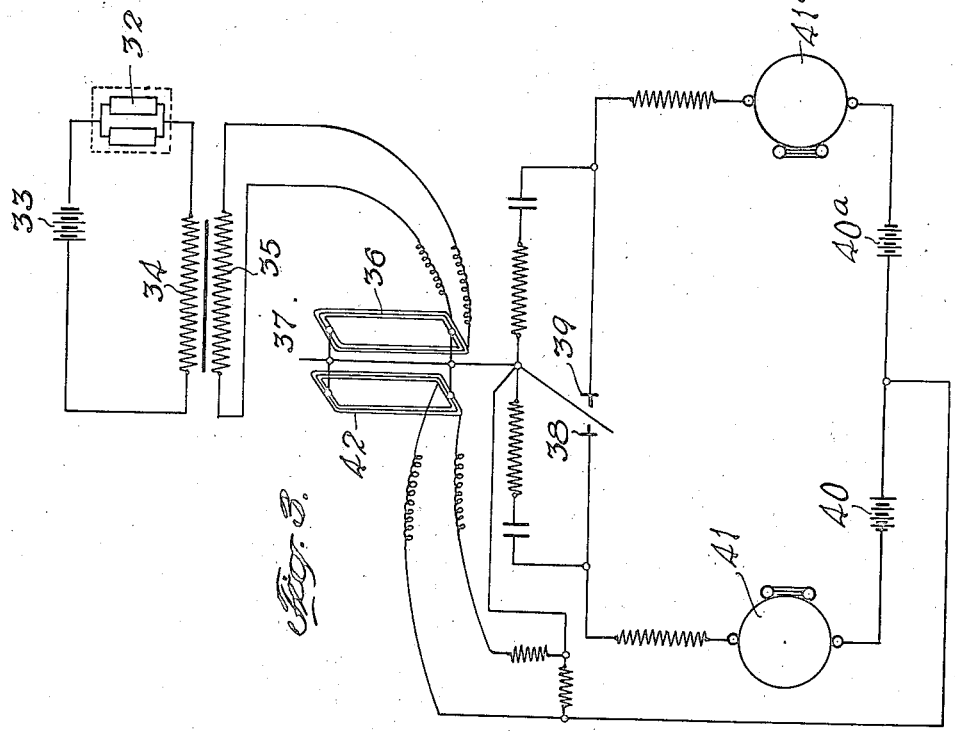
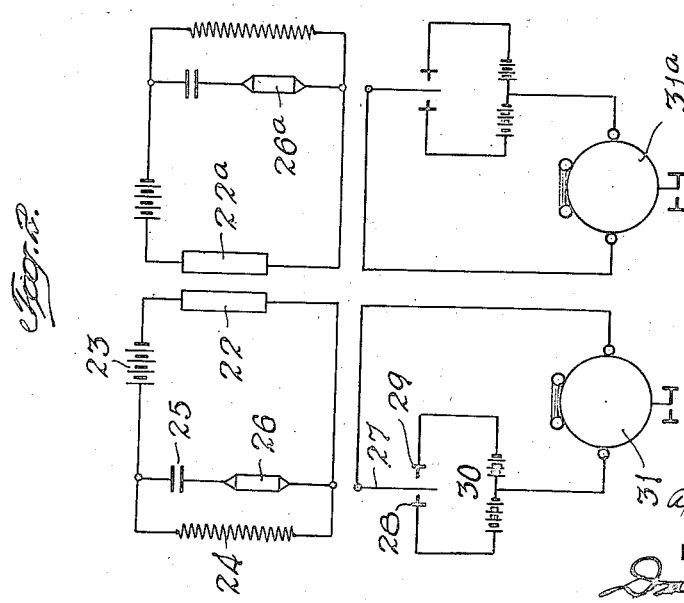
INVENTOR
Alexander Cunningham
BY
ATTORNEY Patented Oct. 31, 1922.

1,434,283

UNITED STATES PATENT OFFICE.

ALEXANDER CUNNINGHAM, OF BROOKLYN, NEW YORK.

TELEGRAPH.

Application filed December 14, 1917. Serial No. 207,105.

*To all whom it may concern:*

Be it known that I, ALEXANDER CUNNINGHAM, a subject of the King of Great Britain, and resident of the borough of Brooklyn, county of Kings, city and State of New York, have invented certain new and useful Improvements in Telegraphs, of which the following is a specification.

This invention relates particularly to telegraphic receiving apparatus designed for use with telegraph lines of great retardation, such as long submarine cables in which the received impulses of current are weak; and it has for its principal object to provide means whereby the well-known characteristics of a selenium cell may be availed of for amplifying the signals.

The invention may be used as a receiving apparatus, or as a receiving and relaying apparatus; the great advantages of the invention being more fully realized in the latter use of the apparatus.

It is well known that the resistance of selenium responds or varies with extreme rapidity to any change in the intensity of illumination to which it may be exposed. In attempting to make use of this property of a selenium cell to repeat signals from one circuit to another, it invariably has been found that the resistance of the selenium depends on the intensity of light to which it is exposed and the time during which it is subjected to the change of illumination. Consequently, if the light falling on a selenium cell is either increased or diminished by means of a received electrical impulse indicating a signal, the extent to which the selenium resistance will change will be dependent upon the duration of the signal. At the cessation of a signaling current or impulse there is a change in the illumination of the selenium cell and the cell is slow in its return to normal condition, whether that normal condition be one of illumination of a greater or less degree. While the absolute resistance of the selenium is a variable quantity or condition, the response to the beginning and the cessation of a signal, due to the change in the illumination of the cell, is very rapid and this rapidity is made use of in the invention described herein to operate a cable relay or cable receiving apparatus in various ways. The methods described herein have been in actual use and have given very satisfactory results.

In the drawings, Fig. 1 is a diagrammatic view of a telegraph apparatus embodying the invention;

Fig. 2 a similar view of a different form of apparatus in which the holding-on coils shown in Fig. 1 are omitted;

Fig. 3 a diagrammatic view of a telegraph apparatus in which an induction coil is substituted for the condenser shown in Figs. 1 and 2, and a single double-wound relay is employed for receiving signal impulses of opposite character.

In the drawings are shown diagrammatically, several forms of the apparatus for carrying out the invention. The exact connections and arrangements of the original receiving instrument, which is indicated as a form of mirror galvanometer, are not shown as they are precisely like those to be found under working conditions on any long submarine cable circuit. In the drawings 1 designates the ordinary suspended receiving coil which carries a mirror 2 which is arranged to receive a beam of light from a lantern or other source of illumination 3. The receiving coil 1 is connected up in the usual manner with the cable 4, the cable circuit being grounded at 5.

In Fig. 1, 6 and 6ª designate separate selenium cells which are normally fully illuminated by the mirror 2 when the receiving coil 1 of the cable receiving means is at rest, as illustrated in the drawing. The selenium cell 6 is in circuit with a local battery 7, a condenser 8, and coil 9 of a double-wound relay 10. This cell is also connected up through the battery 7 and resistance coil 11. The coil 9 of the relay is in circuit with the condenser 8 and the selenium cell, while the resistance coil 11 is in circuit with the selenium cell and the battery in a shunt around the condenser so that said resistance coil is not directly in circuit with the relay coil 9.

The selenium cell 6ª is similarly in circuit with a local battery 7ª, condenser 8ª, relay coil 9ª of the double-wound relay 10ª, and with the resistance coil 11ª.

The second coil 12 of the relay 10 is in circuit with a local battery 13 and a repeating relay 14; and the rotatable suspension means for said relay carries a contact arm 15 which is arranged to vibrate between two stops, one of which, 16, is a contact stop which forms the terminal of one pole of the battery 13; the other stop 17 being merely a dead back stop. The contact arm 15 is electrically connected to the relay 14 and forms the means for making and breaking the local battery circuit through said relay. The condenser 19 and resistance 18 shunt the contact points 15 and 16 in the usual manner and for a purpose well known. Resistance coils 20 and 21 enable a proper proportion to be obtained between the strength of the moving impulse, that is to say the impulse which moves the contact arm 15 of the relay 10, and the holding-on currents, to be presently described, which pass through the coil 12 of the relay 10 and serve to hold the arm 15 against the contact 16 during the signal impulse or interval. The relay 14 may be what is known as the post office relay, but, of course, any suitable form of relay may be used. As any form of signal repeating relay or apparatus may be used, it is thought not essential to minutely illustrate or describe the apparatus for repeating the signals into the second cable. This apparatus is diagrammatically illustrated in Fig. 1, in which 4$^a$ designates the second cable.

The second coil 12$^a$ of the relay 10$^a$ is connected up to a local battery 13$^a$ and a second post office relay 14$^a$, precisely as coil 12 of relay 10. The relay 10$^a$ is also provided with a contact arm 15$^a$ which operates precisely as arm 15 of the relay 10 and vibrates between the dead back stop 17$^a$ and the terminal stop 16$^a$, this latter stop being in circuit with the local battery 13$^a$. Resistance coils 18$^a$, 20$^a$ and 21$^a$ are provided for the same purpose as the coils 18, 20 and 21. The condenser 19$^a$ and resistance 18$^a$ shunt the contact points 15$^a$ and 16$^a$. The resistance coil 11$^a$ is for the same purpose as the corresponding coil 11.

The selenium cell 6, relay 10 and the apparatus connected therewith constitute what may be termed one "set," which is utilized to repeat incoming signals of one character, for instance the positive impulses or signals, while the apparatus connected with the selenium cell 6$^a$ and the relay 12$^a$ constitute an entirely independent set which is used for repeating incoming signals of the opposite character, for instance negative signals. It is, of course, immaterial which set receives and repeats the positive or negative signals, it being only necessary that one set shall receive the signals of one character and the other receive opposite character signals.

Assuming that the cell 6 is arranged and designed to receive signal impulses of positive character, the receiving coil 1 will be so moved by such character signal as to move the beam of light away from the cell 6 while maintaining it on the cell 6$^a$. This will cause a sudden increase in the resistance of the cell 6 and result in a sudden impulse of current through coil 9 of the double-wound relay and shunt 11 due to the discharge of the condenser 8. This impulse will move the relay 10 and cause the contact arm 15 to engage the terminal contact 16, thereby completing the local battery circuit through the coil 12 and relay 14. The local battery current passing through the coil 12 will serve as a "holding-on" current, which will maintain the arm 15 against the contact 16 and preserve the current through the relay 14 so long as the cell 6 remains out of, or partially out of, the field of the beam of light. The result of this is that the gradual further change in the resistance of the selenium cell will not affect the signal impulse through the relay 14, the contact arm 15 having once been brought into engagement with the terminal contact 16, it will be held there by the current impulse through the coil 12 until such time as there is a second violent change in the resistance of the cell 6. At the cessation of the signal the beam of light will return to normal, thereby again illuminating the cell 6 and bringing about the second change in the cell 6 by lowering its resistance, which change will result in a charge of the condenser in the direction opposite the discharge which followed the decrease in the illumination of the cell. This charge into the condenser will move the relay 10 and withdraw the contact arm 15 from the terminal contact 16, thereby breaking the local battery circuit through the relay 14 and marking the termination of the signal. The resistance coils are so disposed that the charge of the condenser, marking the termination of the signal impulse, will be sufficient to overcome the holding-on current and withdraw the arm 15 from the contact 16.

The second set designed to receive and repeat incoming signals of negative character operate precisely as cell 6 and relay 10, the negative impulse operating the receiving coil to move the beam of light from the cell 6$^a$, and the cessation of said signal operating the coil to move the beam of light back to the cell 6$^a$, the movements of the beam marking the beginning and the end of the signal impulse.

The relays 14 and 14$^a$ and their local batteries 13 and 13$^a$ are arranged in such manner as to repeat into the second cable current impulses of opposite character, each of the relays 14 and 14$^a$ repeating into the second cable character impulses corresponding with the impulses received by them from the incoming cable signals.

In Fig. 2 is shown a form of receiving apparatus in which the "holding-on" coils of Fig. 1 are dispensed with. As shown in this figure, two selenium cells 22 and 22$^a$ are employed, said cells being adapted to be illuminated in the normal position of the receiving coil, as shown in Fig. 1. The cell 22 is in circuit with a local battery 23, a resistance coil 24 and condenser 25. The relay is indicated at 26 and is in circuit with the condenser 25 and the cell 22. This relay is provided with a contact arm 27 which is arranged to vibrate between the two contacts 28 and 29 connected to the terminals of the local split battery 30. A polarized relay 31 is in circuit with the contact arm 27 and the terminals of the split battery 30, and said neutral relay serves as the sending-on and repeating relay and may be of the post-office type, or any other suitable form.

The selenium cell 22ª is connected up to its receiving relay coil 26ª and to its sending-on or repeating relay 31ª, precisely as cell 22, this part of the apparatus illustrated in Fig. 2 constituting the second set; the parts described in connection with cell 22 constituting the first set. Each of these cells is designed to receive and repeat signals of opposite character. The neutral relays 31 maintain the sending-on impulse until the releasing impulse of opposite direction is discharged through the condenser and the relay coil 26, so that the holding-on coils of the apparatus illustrated in Fig. 1 are unnecessary.

In the operation of the apparatus shown in Fig. 2, a change in the illumination of cell 22 to increase the resistance thereof at the beginning of an impulse or signal will cause a discharge of current through condenser 25 and relay coil 26, thereby moving the contact arm 27 against one of the contacts 28 or 29. This will complete the local battery circuit through the polarized relay 31 and move the contact arm thereof in one direction against its contact stop. The contact arm of the polarized relay will remain in this position until the cessation of the signal impulse, whereupon the cell 22 will be again illuminated thereby causing a second impulse of current charging the condenser 25 in the opposite direction to the first impulse or condenser discharge. This second current impulse will move the relay coil 26 in the opposite direction and withdraw the contact arm 27 from one of the terminal stops 28 or 29 and bring it into engagement with the opposite contact, thereby sending a local current impulse in the opposite direction through the neutral relay. This will end the repeated signal impulse.

It is obvious that the apparatus constituting the second set will operate precisely as that described as the first set, the second set receiving and repeating signals of opposite character to those received and repeated by the first set.

In Fig. 3 is illustrated a method of using an induction coil, instead of a condenser as illustrated in Figs. 1 and 2, to obtain the initial and final throws of the relay contact arm set up by the selenium cell in response to the movements of the light beam reflected from the mirror. In this view 32 is the selenium cell connected in series with a battery 33 and the primary winding 34 of an induction coil. The secondary winding 35 of the induction coil is connected to the windings 36 of the moving coil of a sensitive relay 37. 38 is the moving arm of the relay which is arranged to vibrate between stops 38 and 39. The stops 38 and 39 are connected to split battery 40, 40ª, through post office relays 41 and 41ª. The split battery is also connected to the secondary winding 42 of the relay 37.

The beam of light is so arranged that a movement of it decreases or increases the resistance of the selenium cell according as it increases or decreases the illumination of the cell.

The initial movement of the spot of light causes a charging current to pass in one direction through the primary winding 34 of the induction coil, thereby inducing a current in the secondary, which current passes through the coil 36 of the sensitive relay thereby moving the contact arm of said relay into engagement with one or the other of the contacts 38 and 39, depending upon the character of the received current impulse. The contact arm is in circuit with the local battery as indicated in the diagram, and therefore closes the local circuit through one of the post office relays 41 or 41ª, and also closes the local circuit through the holding-on coil 42 of the sensitive relay 37. It is manifest that the contact arm of the sensitive relay will, therefore, be held against its contact stop until a further sudden change in the resistance of the selenium cell. When the resistance of the cell is again suddenly changed by reason of a change in the illumination of the cell, a momentary impulse of current will be sent through the primary winding of the induction coil in the direction opposite to the first current impulse, thereby inducing an impulse of current in the secondary winding of the induction coil and through the winding 36 of the sensitive relay. This impulse of current will move the contact arm of the sensitive relay away from its contact stop into a neutral position, thereby marking the end of the signal impulse, the selenium cell and the sensitive relay 37 being then in their normal conditions. A current impulse of opposite character will serve to move the contact arm of the sensitive relay against the other contact stop, thereby operating the other post office relay and transmitting into the second cable or other receiving means an impulse corresponding in character to the received impulse. It is manifest, therefore, that coil 36 of the sensitive relay first receives an impulse throwing it momentarily in one direction at the commencement of the signal movement of the spot of light, and receives an opposite impulse on the cessation of said signal impulse movement, that is to say return of the spot of light to its normal or at-rest position.

What I claim is:

1. In an apparatus for the transmission of cable code signals, two separate local circuits, one to register dots and the other to register dashes, each circuit including a selenium cell, a battery, a relay and means for preventing direct flow of current through the relay, said relay and said means being shunted by resistance.

2. In an apparatus for the transmission of cable code signals, two entirely separate circuits one to register the dots and the other to register the dashes and each circuit including a selenium cell, a source of electrical energy, a condenser, a relay, the relay and condenser being shunted by a resistance.

3. A telegraph receiving apparatus comprising a selenium cell, a relay and a condenser in circuit therewith, the relay and condenser being shunted by a resistance, a double-wound relay one coil of which is in circuit with the condenser and the selenium cell, and means operated by said double-wound relay to hold a local battery circuit closed for the duration of the incoming signal impulse.

4. A telegraph receiving apparatus comprising a selenium cell, a double-wound relay and a condenser, means for sending an impulse of current through one of the windings of said relay upon a change of resistance of the selenium cell, means operated by said relay to hold a local battery circuit closed through the other relay winding until said first winding receives an impulse in the opposite direction due to the discharge of the said condenser.

5. A telegraphic receiving apparatus of that class in which an incoming signal impulse varies the illumination of a selenium cell, characterized by a local circuit including the selenium cell and a source of current, a double-wound relay and a condenser, means for sending an impulse of current through one winding of the relay upon a variation in the illumination of the selenium cell, means operated by said relay to hold a local circuit closed through the other relay winding until said first winding receives an impulse in the opposite direction due to the discharge of the condenser.

6. A telegraphic receiving apparatus comprising two separate circuits each including a selenium cell, a condenser, a sensitive relay and a local battery in circuit with said selenium cell, a resistance shunting the relay and the condenser, a local relay circuit, a relay therein, and means operated by the movement of the sensitive relay of the selenium cell circuit to operate the relay in the local circuit to mark the beginning and end of the received signal impulse.

7. A telegraphic receiving apparatus comprising a selenium cell, a condenser, a double-wound relay one coil of which is in circuit with the selenium cell, and means operating through the other coil of said relay to hold a local battery circuit closed through the other relay winding until said first winding receives an impulse in the opposite direction due to the discharge of the condenser.

8. A telegraphic receiving apparatus comprising a local circuit to receive the incoming signals, a double-wound relay and a condenser one coil of which relay is in circuit with said local receiving circuit and through which an impulse of current is sent in response to the incoming signal, and means operated by said relay to send an impulse of current through the other winding of the relay to hold a local battery closed through the other relay winding until said first winding receives an impulse in the opposite direction due to the discharge of the condenser.

9. A telegraph receiving apparatus comprising two local receiving circuits, means to produce quick changes in resistance in each of said local circuits at the beginning and end of each signal impulse, a condenser in each of said local circuits to obtain control of and utilize the quick differences in resistance in the receiving circuits, and means to utilize the discharges of current through the condenser for repeating the received signal impulses.

10. A telegraphic receiving apparatus comprising two independent selenium cells, a relay and a condenser in circuit with each of said cells, the relay and condenser being shunted by a resistance, a double-wound relay for each selenium cell circuit, one coil of which is in circuit with the condenser and selenium cell, and means operated by each of said double-wound relays to hold an independent local circuit closed for the duration of the incoming signal.

In testimony whereof I hereunto affix my signature.

ALEXANDER CUNNINGHAM.